United States Patent [19]
Westall et al.

[11] Patent Number: 4,703,480
[45] Date of Patent: Oct. 27, 1987

[54] DIGITAL AUDIO TRANSMISSION

[75] Inventors: Frederick A. Westall; Dominic S. Lee, both of Ipswich; Ian R. Cameron, Lillington; Robert W. McLintock, Nr. Sevenoaks, all of England

[73] Assignee: British Telecommunications plc, Great Britain

[21] Appl. No.: 672,232

[22] Filed: Nov. 16, 1984

[30] Foreign Application Priority Data

Nov. 18, 1983 [GB] United Kingdom ............... 83-30885

[51] Int. Cl.$^4$ ........................... H04J 3/12; G10L 3/02
[52] U.S. Cl. .................................... 370/111; 370/102; 375/122; 381/30
[58] Field of Search ...................... 370/111, 58, 110.1, 370/89, 99, 102; 340/347 DD; 381/29-35; 375/122

[56] References Cited

U.S. PATENT DOCUMENTS 3,922,497 11/1975 Artom et al. ........................ 370/111
4,330,858 5/1982 Choquet ............................. 370/111
4,449,190 5/1984 Flanagan et al. ................... 375/122
4,455,649 6/1984 Esteban et al. ........................ 381/29

FOREIGN PATENT DOCUMENTS 0070949 2/1983 European Pat. Off. .
0082333 6/1983 European Pat. Off. .
2063018 5/1981 United Kingdom .

OTHER PUBLICATIONS

IEEE International Conference on Communications, Conference Record, vol. 2, Boston, Mass., Jun. 19-22, 1983, New York (US) S. Ono et al, "64 Kb/s High Quality Speech Codec", pp. 1166-1170.
"Voice/Data Concentrator", Smith et al, 1/79.
ICASSP 81 Proceedings of the IEEE International Conference on Acoustic, Speech and Signal Processing, vol. 2, R. S. Cheung et al, "The Design of a 16KB/S . . .".
1978 IEEE International Conference on Acoustics, Speech & Signal Processing, Estaban et al, "32 KBPS CCITT Compatible Split Band Coding Scheme".

Primary Examiner—Douglas W. Olms
Assistant Examiner—Curtis Kuntz
Attorney, Agent, or Firm—Nixon & Vanderhye

[57] ABSTRACT

A digital sub-band coder for audio signals provides for adaptive allocation of bits to (e.g.) two sub-bands. Estimation of the relative energy content of the bands is determined by reference only to those bits which are always transmitted, so that decoding can take place without the need for transmission of side information. Accompanying data may be transmitted in a fixed bit position, or may be by insertion of the data into the lower energy band. In the latter case, the data may optionally be duplicated in both bands when their energy contents are random. The invention can be applied to embedded ADPCM coders.

38 Claims, 7 Drawing Figures

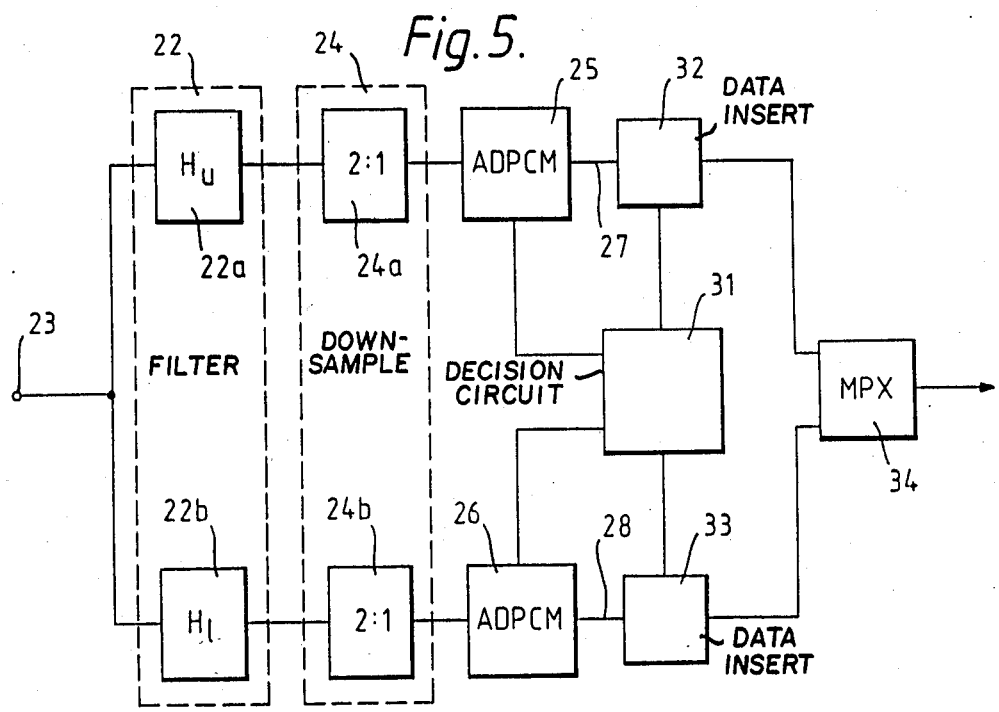
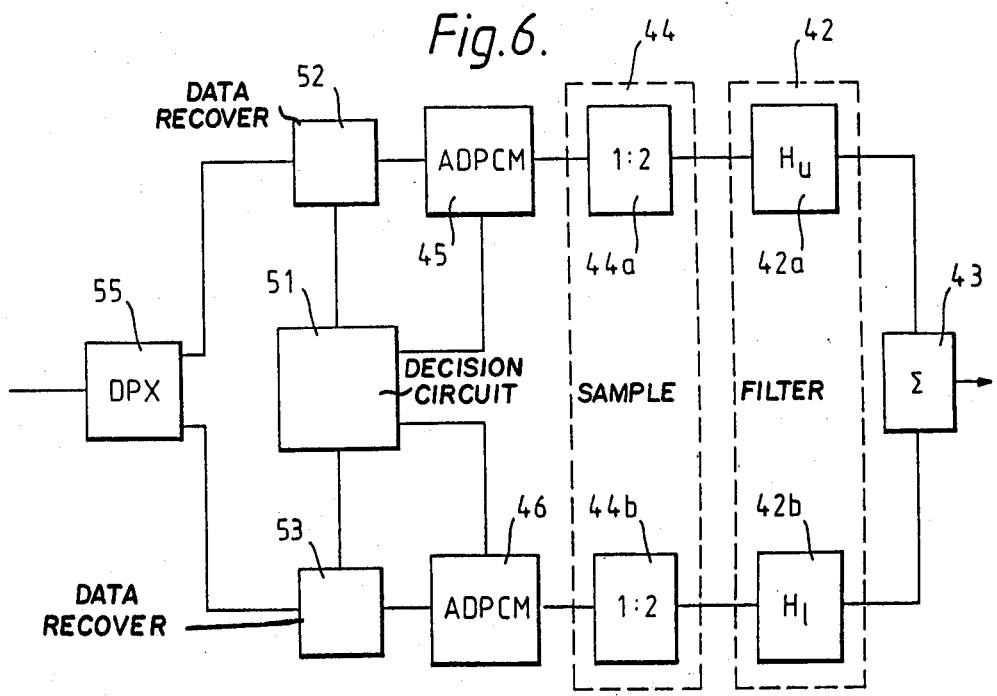

DIGITAL AUDIO TRANSMISSION

FIELD OF THE INVENTION

This invention relates to transmission using sub-band coding, and particularly, though not exclusively, to multiplexing data and digitally coded audio for transmission.

Sub-band coding (SBC) is a coding technique in which a parent frequency band, usually speech, is divided into two or more sub-bands, the frequency range within each of which is separately encoded and transmitted. The main advantages of sub-band coding, for example, over pulse code modulation (PCM) or adaptive differential pulse code modulation (ADPCM) are generally considered to be that:

(a) the quantization noise generated within each sub-band remains confined to that frequency range and on decoding does not mask low level speech sounds in other bands; and (b) each sub-band signal may be coded according to the perceptual contribution that sub-band makes to the overall subjective quality.

SUMMARY OF THE INVENTION

According to one aspect of the present invention, there is provided a method of coding a digital sub-band coded signal, in which the number of bits allocated to the respective sub-bands is adaptively determined as a function of those bits which are always transmitted, whereby the coded signal may be decoded by reference only to the transmitted bits.

In another aspect we provide a digital sub-band coder comprising filter means for dividing the input signal into two or more frequency sub-bands, and adaptive bit allocation means for adaptively determining the number of bits to be used for encoding each sub-band in dependence on the relative energy content of the sub-bands, characterised in that the bit allocation means is responsive only to those bits of each sub-band which are always transmitted.

A further aspect of the invention provides a method of transmitting a digital data signal together with a digital sub-band coded signal which comprises comparing the energy contents in different sub-bands and adaptively inserting data bits into a sub-band with a low energy content.

In yet another aspect, we provide apparatus to transmit digital sub-band encoded signals and digital data signals, comprising means to divide an incoming frequency band into a plurality of sub-bands and means for encoding each sub-band separately, characterized in that the apparatus further comprises means to measure and compare the energy contents of the sub-bands and selectively insert data bits into a sub-band having a low energy envelope.

Conveniently the comparison is made between two adjoining sub-bands. The sub-bands may themselves be sub-bands of lower order sub-bands, or may be the only sub-bands into which the parent frequency band has been divided.

The comparison may be made, for example, by subtracting the respective sub-band stepsizes, but is preferably made by determining their ratio.

BRIEF DESCRIPTION OF THE DRAWINGS

The present invention will now be explained further by way of example and with reference to the accompanying drawings of which:

FIGS. 1, 3 and 5 are schematic diagrams of SBC encoders incorporating the present invention;

FIGS. 2, 4 and 6 are schematic diagrams of SBC decoders incorporating the present invention.

DETAILED DESCRIPTION

Figure 1:
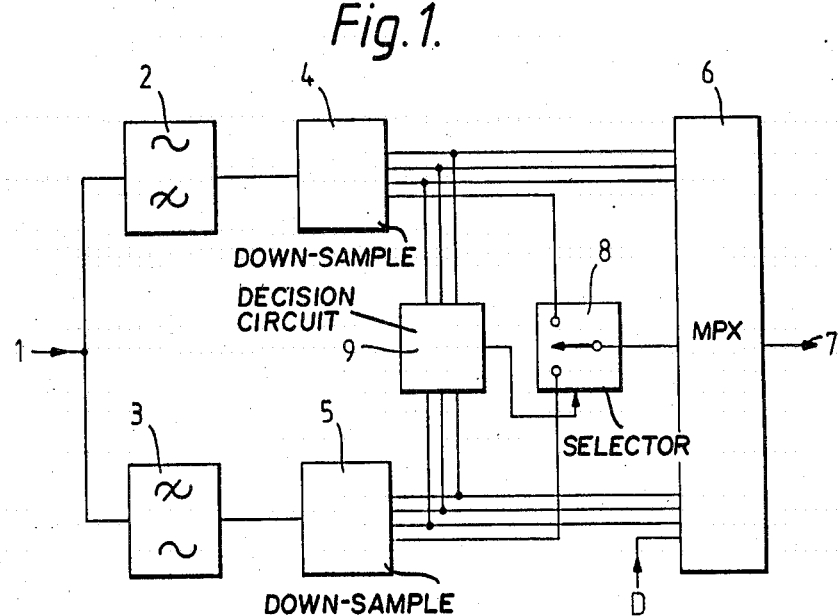

Referring to FIG. 1, a sub-band coder for speech signals receives at an input 1, a speech signal which is assumed to be PCM coded at a sampling rate of 16 kHz. The input frequency spectrum is divided into upper and lower sub-bands by high-pass and low-pass filters 2, 3, the two bands then being down-sampled to 8 kHz in "decimators" 4,5. For the purposes of illustration, the signals at this point are assumed to be quantized to four-bit accuracy, in both bands, although in practice more bits would be used, not necessarily the same number in each band.

An output multiplexer 6 is provided to assemble the output bits into suitable form for onward transmission from its output; it could be part of a t.d.m. system, or simply a parallel-to-serial converter. It has, by way of example, an 8-bit input. One bit of these eight is permanently assigned to transmission of an auxiliary data signal D; note however that this is incidental to the principle being illustrated in FIG. 1.

An adaptive allocation of the remaining seven available bits to the two channels is effected on the basis that one channel will be transmitted with 3-bit accuracy, the other 4-bit. Thus the 3 most significant bits $h_3-h_1$, $l_3-l_1$ of the two channels are permanently assigned to respective bit inputs of the multiplexer 6, while the eighth input of the multiplexer receives, via a selector 8, the least significant bit $h_0$ or $l_0$ of a selected one of the two channels.

The corresponding decoder (FIG. 2) is essentially a mirror image of the transmitter, a demultiplexer 16 feeding the three most significant inputs of up-samplers 14, 15 which in turn supply interpolation filters 12,13 the outputs of which are added at 10 to form the decoded output 11.

Returning to the coder of FIG. 1, the selector 8 is controlled by a decision circuit 9 which determines which of the two least significant bits $h_0$ or $l_0$ is to be transmitted. This decision is made as a function of the relative signal or energy content of the two channels, and the corresponding deselection (by a one-bit demultiplexer 18) at the decoder is controlled by a functionally identical decision circuit 19.

So that the decoder decision circuit can accurately "track" operation of that in the coder, the decision circuits are in each case responsive *only* to the three most significant bits $h_3-h_1$, $l_3-l_1$ of the two channels. The decoder decision circuit does not, of course, have access to both $h_0$ and $l_0$; nor does it "know" prior to making its decision, which of them it does have access to.

The decision circuits 9, 19 serve to assess which channel has the higher energy content, so that the dropping of the least significant bit will occur in a channel where it makes the lesser noise contribution. Although it would be possible to do this on a sample-by-sample basis (where a simple comparator would suffice), for a practical system it would compare and average energy estimates formed over a period; this will be discussed further below.

Figure 3:
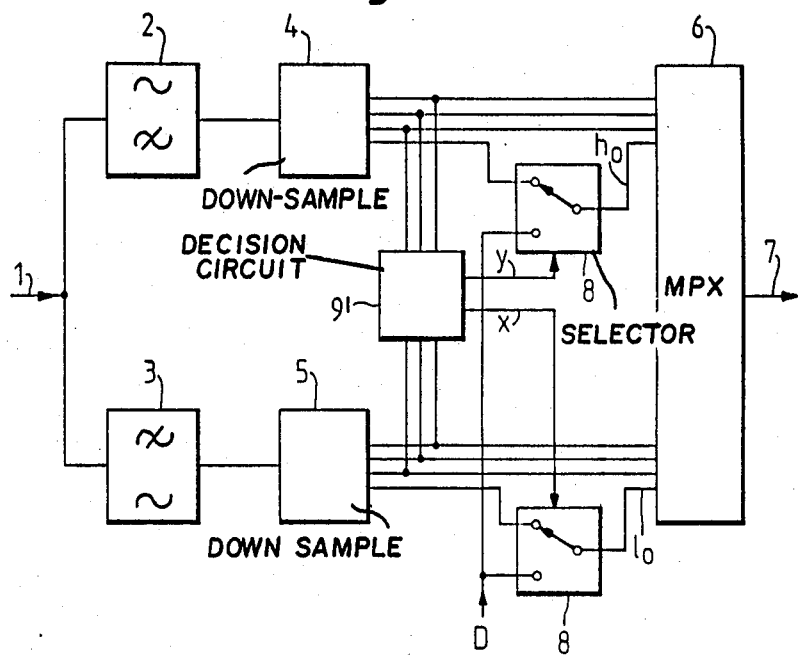

FIG. 3 shows a modified version of the coder of FIG. 1, where, of the eight available bits, four are allocated to each of the two channels, the auxiliary data D being adaptively inserted in the least significant bit position $h_0$ or $l_0$ of one of the two channels. As shown, however, the decision circuit 9' has two outputs x, y which are active when the ratio of the energy in the upper channel to that in the lower respectively exceeds a lower threshold or falls below a higher one, so that when it falls between the two thresholds, the data is inserted into *both* channels. In the receiver (FIG. 4), a single decision threshold is used, as before. In this way, corruption of the data by errors in the decision, due to finite computational accuracy, or transmission errors, are reduced.

Figure 2:
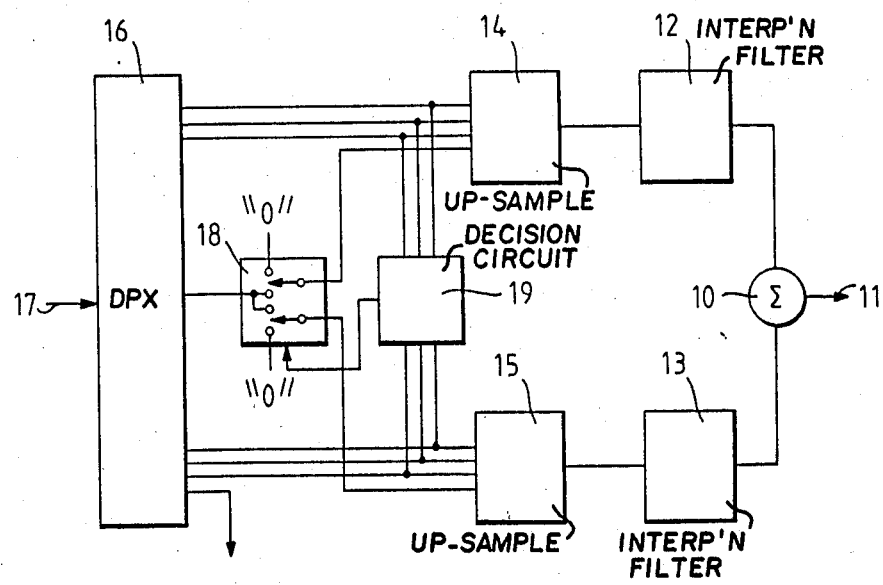
Figure 4:
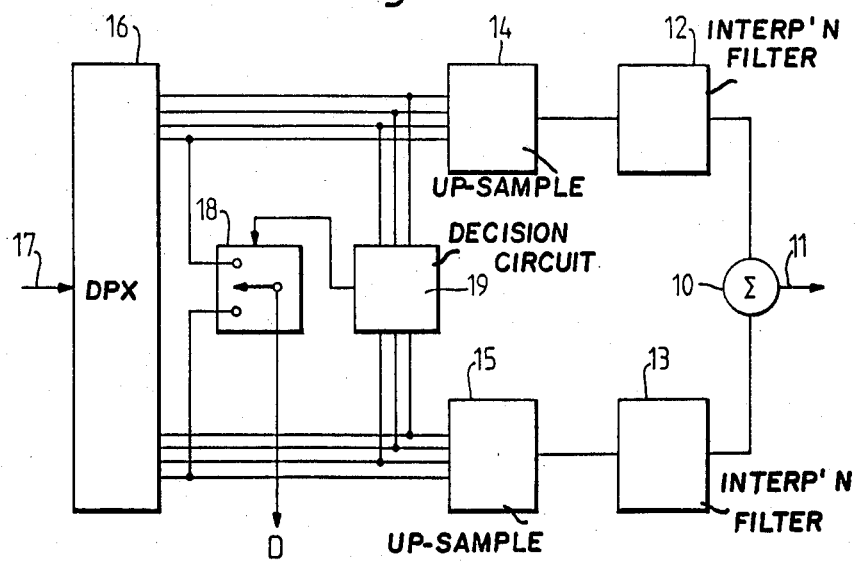

A more practical version of the coder and decoder of FIGS. 3 and 4 will now be described; note however that much of what follows could also be applied to the coder and decoder of FIGS. 1 and 2.

The coder, suitable for receiving a wide band speech input signal of 7 kHz bandwidth sampled at 16 kHz and transmitting it at 64 kbit/s is shown in FIG. 5 and uses ADPCM (adaptive differential pulse code modulation). Differential coders normally suffer from an excessive signal-to-noise penalty if bits are deleted and to rectify this, an embedded ADPCM coding is used. Embedded coders are described in "Embedded DPCM for variable bit rate transmission", David J. Goodman, IEEE Trans. Comm. Vol COM-28, No. 7, July 1980, pp 1040 to 1046. The encoder described there is not an adaptive coder (nor is it used for sub-band coding). Essentially, an embedded DPCM coder solves the problem (with a small SNR penalty due to less accurate prediction and hence a higher quantizer step size and thus quantization noise) in that any bits liable to be omitted on transmission are excluded from the predictor loop at both coder and decoder.

Referring again to FIG. 5, the sub-band coder comprises a digital filter 22 consisting of a high pass filter 22a and a low pass filter 22b which divides the digitally (e.g. PCM) encoded input signal at terminal 23 into two sub-bands, which are down sampled in respective down sampling circuits 24a and 24b of a "decimator" 24 from where they are supplied to ADPCM encoder 25 connected to the output of down sampler 24a, and ADPCM encoder 26 connected to the output of down sampler 24b. The ADPCM encoders 25 and 26 have code word outputs 27 and 28 respectively. The ADPCM encoders 25 and 26 also have outputs and providing a signal indicative of the stepsize to a decision circuit 31. The output of the decision circuit 31 is connected to data insertion circuits 32 and 33, and controls their operation in the manner explained below. The outputs of data insertion circuits 32 and 33 form the inputs of an 8 bit multiplexer 34 whose output is the signal to be transmitted.

The digital filter 22 comprises quadrature mirror filters (QMFs) which are used to split the input spectrum into two overlapping bands (0–4 kHz, and 4–8 kHz). Suitable filter constants are listed in Table 1. The signals contained in each of the two sub-bands are then applied to the respective down sampler 24a (4–8 kHz) and 24b (0–4 kHz) where they are down sampled to 8 kilo samples per second and applied to the two independent ADPCM coders 25 and 26 respectively. ADPCM coders per se are known, and for the present purposes it will be sufficient to note that the encoding of the two sub-bands in ADPCM encoders 25 and 26 is not symmetric, in that the lower sub-band is encoded using ADPCM with a 5 bit robust Jayant quantizer (AQJ) and a fixed fourth order predictor optimized for 4 kHz bandwidth speech. The higher sub-band (4–8 kHz) is encoded by a 3 bit robust AQJ with a fixed first order predictor.

In the receiver of FIG. 6 the lower and upper sub-bands are demultiplexed in demultiplexer 55 and are then processed in essentially the inverse order of that performed on encoding, with the components 42 to 53 being essentially the mirror images of the corresponding components 22 to 33 of the encoder.

The 64 Kbit/s signal is demultiplexed, decoded, interpolated and processed by the receiver QMF bank to recover the 7 kHz bandwidth signal, the two channels being combined in an adder 43.

The SBC encoder and decoder additionally include data insertion and data recovery circuits 32, 33 and 52, 53 respectively, as well as the data insertion and data recovery decision circuits 31 and 51.

The 3 bit and 5 bit outputs of the ADPCM encoders 25 and 26 respectively are applied to the data insertion circuits 32 and 33 where a single data bit is inserted into, and thus replaces the existing bit in, the fifth encoded (least significant) bit position for the lower channel output, or into the third encoded bit position for the upper channel, or into both, in accordance with the data insertion strategy described below.

Thus the output from the SBC coder is configured either as $5+(2+D)$ or $(4+D)+3$, or $(4+D)+(2+D)$, where D is the data bit.

Figure 7:
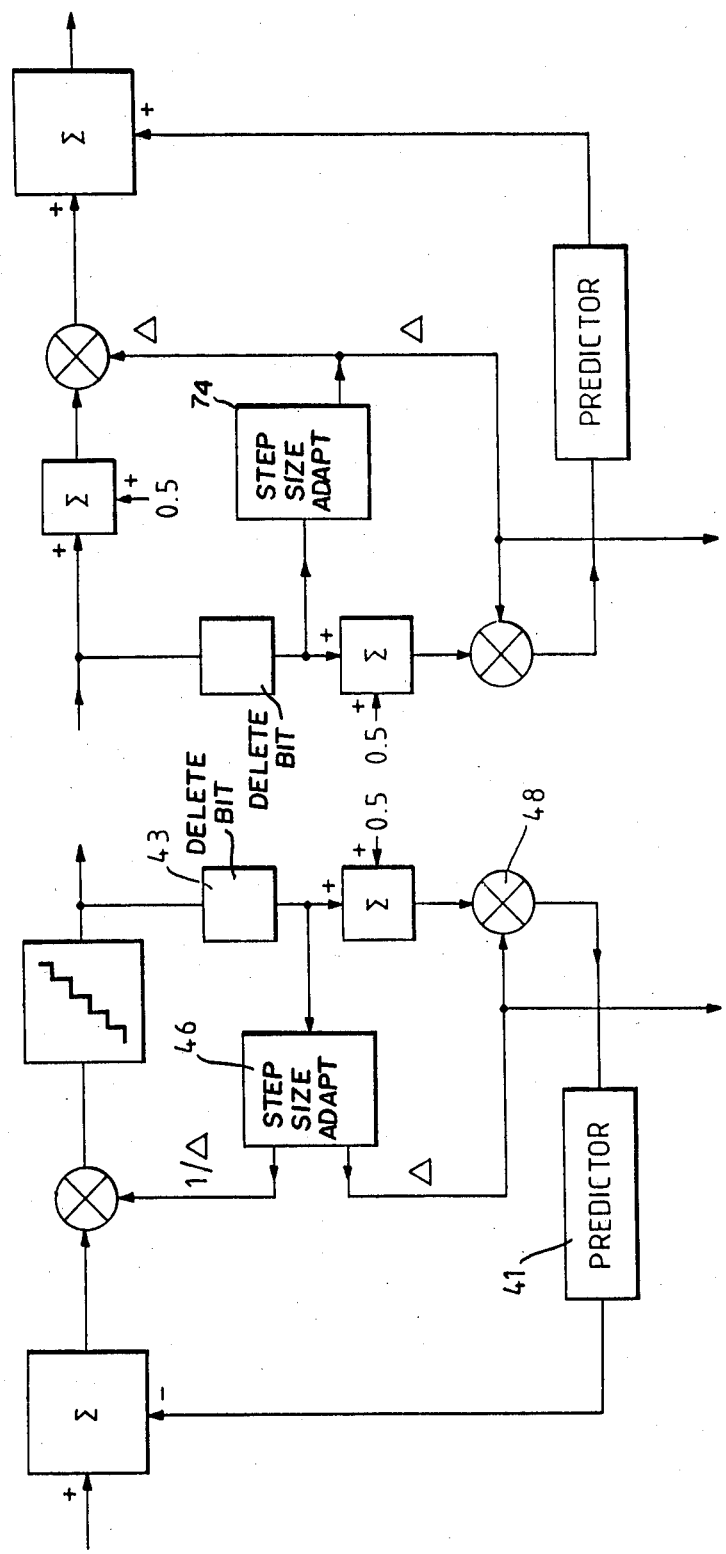
FIG. 7 is a schematic diagram of an embedded ADPCM coder and decoder.

In this embodiment, the decision circuits 31,51 are comparators which compare the adaptor stepsize (scaling factor) generated in the stepsize adapting circuits 64 and 74 of FIG. 7, which is a block diagram of the ADPCM coder 25 or 26 and decoder 45 or 46. The data insertion decision strategy and the corresponding data recovery strategy operate on the following principles.

It is clearly desirable that the decision as to which channel receives the data bit should not require any transmission of side information to the receiver to provide correct demultiplexing. For this reason a backward adaptive data multiplexing strategy is employed where the multiplexing and demultiplexing data channel selection decision is derived from the transmit quantizer output code words and receiver input code words respectively.

The data channel selection strategy is determined as follows. A spectral envelope estimate, that is essentially a measure for the energy content, is obtained for each sub-band signal and the estimates for the two channels are then compared to give a three way decision voiced (such as vowels), unvoiced (such as the syllables) and intermediate.

When it is clear that voiced sounds are present the upper channel (4–8 kHz) is selected for the data bit, and 5 bits are then available for accurate representation of the predominantly lower channel signal.

When unvoiced sounds are present, or alternatively, when it is not clear whether the speech is voiced or unvoiced, the lower channel (0–4 kHz) is arranged to carry the data bit thus leaving 4 bits available for coding the speech signal in the lower band. The full 3 bits are then available in the upper channel for accurately coding the higher frequencies of the speech signal.

To avoid the need to transmit any side information the short term spectral envelope information for the data insertion decision is derived from the quantizer stepsize parameters for the two channels. This information is derived in a backward adaptive mode, using the robust Jayant algorithm, i.e. the stepsize parameter for the lower and upper channel quantizers respectively is given by $$\Delta l(n+1) = \Delta l(n)^\gamma \cdot Ml(Il(n)) \quad (1)$$

and $$\Delta u(n+1) = \Delta u(n)^\gamma \cdot Mu(Iu(n)) \quad (2)$$

where Il(n) is the nth output codeword for the lower channel quantiser and Iu(n) is the output codeword from the upper channel quantiser. Ml(.) and Mu(.) are multiplier functions shown in table 1b for quantisers with various numbers of bits. $\gamma$ is a "leakage factor" which is required in order to dissipate the effect of transmission errors. Typically, $\gamma$ is chosen to be 0.984.

In practice it is more convenient in the coder implementation to re-express equations 1 and 2 in logarithmic form to eliminate the complex exponentiation operations:

$$dl(n+1) = \gamma \cdot dl(n) + ml(Il(n)) \quad (3)$$

and $$du(n+1) = \gamma \cdot du(n) + mu(Iu(n)) \quad (4)$$

where, dl(.), du(.), ml(.) and mu(.) are respectively the logarithmic values of $\Delta l(.)$, $\Delta u(.)$, Ml(.) and Mu(.).

It is easy to show that the above recursive algorithm produces a measure of the short-term envelope of the bandlimited speech within each sub-band.

The decision as to which sub-band is to receive the data bit is determined as follows. First the scaled ratio of the lower and upper quantiser step-sizes is obtained as:

$$V(n) = \frac{\mu \cdot \Delta u(n)}{\Delta l(n)} \quad (5)$$

where $\mu$ is a constant and V(n) is the time varying signal applied to the subsequent data bit assignment strategy.

To simplify the digital processing, equation 5 is expressed in a logarithmic form:

$$v(n) = \log(\Delta u(n)) + \log(\mu) - \log(\Delta l(n)) \quad (6)$$

$$= du(n) - dl(n) + \log(\mu) \quad (7)$$

By experiment the value of $\mu$ in equation 7 was set to 2.

It is apparent that a voiced/unvoiced decision could be made if the decision threshold is set to v(n)=0. Unfortunately the use of such a hard decision process creates the possibility of systematic data channel selection errors occurring when the value of v(n) lies close to the decision level. This may happen due to the effects of finite precision limitations or as a result of the residual effect of channel errors and would cause the v(n) calculated from the decoded signals in the receiver not being perfectly in synchronism with the function v(n) determined at the transmitter.

For this reason the transmitter implies (soft) decision thresholds, which cause the insertion of the data bit simultaneously into both sub-bands when v(n) falls between an upper and a lower threshold, $\tau u$ and $\tau l$. The decoder forms the comparison with a hard middle threshold, $\tau$. Although the use of both channels momentarily reduces the performance on the speech channel, it makes the data channel more robust to transmission errors and eliminates systematic errors due to misalignment of the stepsize parameters derived in the encoder and the decoder respectively.

In a pilot experiment, the adaptive data insertion technique of the present invention was simulated in floating point Fortran on a mini computer and compared with a fixed data bit assignment technique, that is the technique where the data are multiplexed at all times into either the upper or the lower sub-band code words. The finite precision limitations of an NEC $\mu$PD 7720 microprocessor such as is commonly used in speech coding transmitters and receivers, were simulated and facilities were also provided to inject random errors into the serialised output (the channel) of the sub-band coder.

The afore-described is a simple yet potentially powerful technique for insertion, for example, 8 Kbit/s of data into a 56 Kbit/s SBC coded wideband speech channel. The technique described may be combined with for example adaptive prediction in the lower band, to increase the data carrying capacity beyond this.

The main advantages of the technique are:
1. The scheme is relatively simple to implement and uses processing capacity available in the coder DSP (digital signal processing) micro computer.
2. There is no need for transmitting side information to control the data demultiplexing function.
3. In the example described above the scheme offers a constant data carrying capacity of 8 Kbit/s.
4. The technique may be combined with other techniques to increase the data carrying capacity, in the example 2 16 Kbit/s or more.

Compared to a fixed data multiplexing strategy, where the data bit is assigned constantly to e.g. the lower channel, the present technique results in a noticeable reduction in the perceivable distortion.

TABLE 1

Coder Coefficients a. Filter Coefficients

$h_l(0) = h_l(31) = 0.002245139$
$h_l(1) = h_l(30) = -0.003971152$
$h_l(2) = h_l(29) = -0.001969672$
$h_l(3) = h_l(28) = 0.008181941$
$h_l(4) = h_l(27) = 0.000842638$
$h_l(5) = h_l(26) = -0.014228990$
$h_l(6) = h_l(25) = 0.002069470$
$h_l(7) = h_l(24) = 0.022704150$
$h_l(8) = h_l(23) = -0.007961731$
$h_l(9) = h_l(22) = -0.034964400$
$h_l(10) = h_l(21) = 0.019472180$
$h_l(11) = h_l(20) = 0.054812130$
$h_l(12) = h_l(19) = -0.044524230$
$h_l(13) = h_l(18) = -0.099338590$
$h_l(14) = h_l(17) = 0.132972500$
$h_l(15) = h_l(16) = 0.463674100$
$h_u(n) = (-1) \cdot h_l(n)$ where $n = 0, 1, 2, \ldots (N - 1)$ b. Multiplier Coefficients

| No of Coder Bits | Step Multipliers |
|---|---|
| 2 | 0.8, 1.6 |
| 3 | 0.9, 0.9, 1.25, 1.75 |
| 4 | 0.9, 0.9, 0.9, 0.9, 1.2, 1.6, 2.0, 2.4 |

TABLE 1-continued

| Coder Coefficients | |
| --- | --- |
| 5 | 0.9, 0.9, 0.9, 0.9, 0.95, 0.95, 0.95, 0.95, 1.2, 1.5, 1.8, 2.1, 2.4, 2.7, 3.0, 3.3 |

We claim:

1. A method of sub-band coding for transmitting signals from a transmitter to a receiver comprising the steps of (a) dividing an input signal into two or more sub-bands, (b) representing each sub-band by a sequence of digital words each having a plurality of bits, (c) selecting all but at least one of the least significant of each of said digital words from each sub-band to be always transmitted bits, (d) adaptively allocating the number of bits to each sub-band solely as a function of said always transmitted bits, and (e) transmitting said always transmitted bits plus any additionally allocated bit or bits, whereby the coded signal may be decoded at a receiver by reference only to said always transmitted bits.

2. A method as claimed in claim 1 wherein the sub-band coded signal is a digitally coded voice signal.

3. A method as claimed in claim 1 or 2 further including inserting data bits into the coded signal, the data bits being inserted in predetermined bit positions.

4. A method as claimed in claim 1 or 2 further including inserting data bits into the coded signal, the data bits being inserted adaptively into a sub-band with a low energy content.

5. A method as claimed in claim 1 further including comparing the energy content of two adjacent sub-bands.

6. A method as claimed in claim 5 in which the comparison of the energy contents of the sub-bands is effected by taking the ratio thereof.

7. A method as claimed in claim 1 further including comparing the energy content of two adjacent sub-bands, adaptively inserting data bits into a sub-band with a low energy content, and inserting the data bits in both sub-bands if the comparison indicates that the difference of the energy content in the sub-bands, or the difference between their ratio and unity, is less than a predetermined amount.

8. A method as claimed in claim 1, further including coding each sub-band by an embedded adaptive differential pulse code modulator (ADPCM) encoder and comparing the energy content of the sub-bands by comparing the stepsizes of the ADPCM encoders.

9. A method as claimed in claim 1 in which the sub-bands are two adjoining half-bands of 64 kbit/s voice transmission system of a 7 kHz speech bandwidth, the total transmission capacity is 8 bits, and encoding the lower sub-band by 4 or 5 bits and the upper sub-band by 2 or 3 bits.

10. A digital sub-band coder comprising filter means for dividing an input signal into two or more frequency sub-bands, each sub-band being represented by a sequence of digital words each having a plurality of bits, bit selection means for receiving and selecting one or more of the least significant bits of each of said digital words, output means for outputting those of said selected least significant bits, and for always transmitting the remaining bits which were not received by said bit selection means, and adaptive bit allocation means for adaptively determining the number of bits to be used for encoding each sub-band in dependence on the relative energy content of the sub-bands, and to correspondingly control the selection by the bit selection means of bits for output, characterized in that the bit allocation means is responsive only to those remaining bits of each sub-band which are always transmitted.

11. Apparatus as claimed in claim 10 including embedded ADPCM encoder means for encoding the sub-bands, in which the relative energy contents are assessed by comparing the respective quantization stepsizes.

12. Apparatus as claimed in claim 10 or 11 including means to measure and compare the energy content of two adjacent sub-bands.

13. Apparatus as claimed in claim 12 wherein the means for comparing is arranged to derive the ratio of the measured energy contents.

14. Apparatus as claimed in claim 10 including means for inserting data bits into predetermined bit positions of the coded signal.

15. Apparatus as claimed in claim 10 including means for inserting data bits into the coded signal, the insertion means being arranged to selectively insert the data bits into a sub-band having a low energy content.

16. Apparatus as claimed in claim 15 including means to measure and compare the energy content of two adjacent sub-bands, wherein the insertion means includes means for inserting data bits into both bands in the event that the energy contents thereof are dissimilar to less than a predetermined extent.

17. Apparatus as claimed in claim 10 employing digital filters to divide an incoming signal into said plurality of sub-bands.

18. Apparatus to transmit digital sub-band encoded signals and digital data signals and to receive such signals, comprising means to divide an incoming frequency band into a plurality of sub-bands and means for encoding each sub-band separately, characterized in that the apparatus further comprises means for measuring and comparing the energy contents of the sub-bands and data bit allocation means responsive to said means for measuring for selectively inserting data bits into a sub-band having a low energy envelope and means for combining these sub-bands to form a decoded output, whereby no side information is required to be received in order to decode the received signals.

19. A method of sub-band decoding signals received from a transmitter comprising the steps of (a) dividing a received input digital signal into a plurality of sub-bands and at least one additional bit (b) selecting the most significant bit positions of each of said digital words from each sub-band to be always received bits, (c) adaptively allocating said at least one additional bit to said sub-bands solely as a function of said always received bits, and (d) combining the sub-bands to form a decoded output, whereby the received signal is decoded by reference only to said always received bits and without reference to side information.

20. A method as claimed in claim 19 wherein the received sub-band coded signal is a digitally coded voice signal.

21. A method as claimed in claim 19 in which said at least one additional bit is a data bit, the data bits being inserted in predetermined bit positions.

22. A method as claimed in claim 19 in which said at least one additional bit is a data bit, the data bits being inserted adaptively into a sub-band with a low energy content.

23. A method as claimed in claim 22 further including comparing the energy content of two adjacent sub-bands.

24. A method as claimed in claim 23 in which the comparison of the energy contents of the sub-bands is effected by taking the ratio thereof.

25. A method as claimed in claim 19 further including comparing the energy content of two adjacent sub-bands, adaptively inserting data bits into a sub-band with a low energy content, and inserting the data bits in both sub-bands if the comparison indicates that the difference of the energy content in the sub-bands, or the difference between their ratio and unity, is less than a predetermined amount.

26. A method as claimed in claim 19, further including decoding each sub-band by an embedded adaptive differential pulse code modulator (ADPCM) including comparing the energy content of the sub-bands by comparing the stepsizes of the ADPCM decoders.

27. A method as claimed in 19 in which the sub-bands are two adjoining half-bands of 64 kbit/s voice transmission system of a 7 kHz speech bandwidth, the total transmission capacity is 8 bits, and the lower sub-band is decoded to recover 4 or 5 bits and the upper sub-band is decoded to recover 2 or 3 bits.

28. A digital sub-band decoder for decoding signals received from a transmitter comprising means for dividing an input signal into a plurality of sub-bands and at least one additional bit, means for selectively transferring said at least one additional bit to at least one of said sub-bands, means, responsive only to the most significant bit positions of each sub-band which are always received bit positions, for adaptively allocating said at least one additional bit to said sub-bands by controlling said means for selectively transferring in dependence on said always received bits, whereby the received signal is decoded by reference only to said always received bits and without reference to side information.

29. Apparatus as claimed in claim 28 wherein said means for adaptively allocating includes embedded ADPCM decoder means for decoding the sub-bands, in which the relative energy contents are assessed by comparing the respective quantization stepsizes.

30. Apparatus as claimed in claim 28 wherein said means for adaptively allocating includes means to measure and compare the energy content of two adjacent sub-bands.

31. Apparatus as claimed in claim 30 wherein the means for comparing is arranged to derive the ratio of the measured energy contents.

32. Apparatus as claimed in claim 28 in which said at least one additional bit is a data bit and further including means for inserting data bits into predetermined bit positions of the sub-bands.

33. Apparatus as claimed in claim 28, in which said at least one additional bit is a data bit and including means for inserting data bits into the sub-bands by selectively inserting the data bits into a sub-band having a low energy content.

34. Apparatus as claimed in claim 33 including means to measure and compare the energy content of two adjacent sub-bands, in which the insertion means includes means for inserting data bits into both bands in the event that the energy contents thereof are dissimilar to less than a predetermined extent.

35. Apparatus for receiving an input signal including sub-band encoded signals and digital data signals, comprising means for dividing said input signal into a plurality of sub-bands and at least one digital data bit and means for decoding each sub-band separately, characterized in that the apparatus further comprises means for measuring the energy contents of the sub-bands and for selectively inserting said at least one digital data bit into a sub-band having a low energy envelope and means for combining these sub-bands to form a decoded output, whereby no side information is required to be received in order to decode the input signal.

36. A method for receiving and decoding an input signal including digital sub-band encoded signals and digital data signals, comprising the steps of dividing said input signal into a plurality of sub-bands and at least one digital date bit, decoding each sub-band separately, measuring and comparing the energy contents of the sub-bands and selectively inserting said at least one digital data bit into a sub-band having a low energy envelope, and combining the sub-bands to form a decoded output, whereby no side information is required to be transmitted in order to decode the input signal.

37. A method of sub-band coding and decoding for transmitting signals from a transmitter to a receiver comprising the steps of (a) dividing an input signal into a plurality of frequency sub-bands, (b) representing each sub-band by a sequence of digital words each having a plurality of bits, (c) selecting all but at least one of the least significant bits of each of said digital words from each sub-band to be always transmitted bits, (d) adaptively allocating the number of bits to each sub-band solely as a function of said always transmitted bits, (d) transmitting said always transmitted bits plus any additionally allocated bit or bits, (e) receiving said always transmitted bits and said additionally allocated bits, and (f) determining at said receiver solely as a function of said always transmitted bits which sub-band receives the additionally allocated bit or bits, whereby no side information is required to be transmitted in order to decode the transmitted signal.

38. Apparatus for sub-band coding and decoding and for transmitting and receiving signals comprising (a) means for dividing an input signal into a plurality of frequency sub-bands, (b) means for representing each sub-band by a sequence of digital words each having a plurality of bits, (c) means for selecting all but at least one of the least significant bits of each of said digital words from each sub-band to be always transmitted bits, (d) means for adaptively allocating the number of bits to each sub-band solely as a function of said always transmitted bits, (e) means for transmitting said always transmitted bits plus any additionally allocated bit or bits, and (f) means for receiving said always transmitted bits and said additionally allocated bits, said means for receiving including means for determining solely as a function of said always transmitted bits which sub-band receives the additionally allocated bit or bits, whereby no side information is required to be transmitted in order to decode the transmitted signal.

* * * * *